United States Patent
Roh et al.

(10) Patent No.: US 8,054,742 B2
(45) Date of Patent: Nov. 8, 2011

(54) SYSTEM AND METHOD FOR SIDELOBE SUPPRESSION IN COMMUNICATIONS SYSTEMS

(75) Inventors: June Chul Roh, Plano, TX (US); Anuj Batra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 127 days.

(21) Appl. No.: 12/548,300

(22) Filed: Aug. 26, 2009

(65) Prior Publication Data

US 2010/0054115 A1    Mar. 4, 2010

Related U.S. Application Data

(60) Provisional application No. 61/091,879, filed on Aug. 26, 2008.

(51) Int. Cl.
*H04J 11/00* (2006.01)
*H04B 15/00* (2006.01)

(52) U.S. Cl. .................. 370/208; 370/210; 455/63.1

(58) Field of Classification Search ................ None
See application file for complete search history.

(56) References Cited

U.S. PATENT DOCUMENTS

| | | | | |
|---|---|---|---|---|
| 2007/0030796 A1* | 2/2007 | Green | ............ | 370/208 |
| 2010/0061474 A1* | 3/2010 | Razzell | ............ | 375/260 |
| 2010/0165956 A1* | 7/2010 | Razzell | ............ | 370/338 |
| 2010/0166102 A1* | 7/2010 | Seyedi-Esfahani | ........... | 375/295 |
| 2010/0184391 A1* | 7/2010 | Razzell | ............ | 455/114.2 |

* cited by examiner

*Primary Examiner* — Andrew Lee
(74) *Attorney, Agent, or Firm* — Steven A. Shaw; W. James Brady; Frederick Telecky, Jr.

(57) ABSTRACT

A system and method for sidelobe suppression in OFDM communications systems is provided. A method for transmitting an information symbol having a plurality of information sub-carriers and a plurality of active interference cancellation (AIC) sub-carriers includes generating AIC sub-carrier data based on the information to be transmitted, populating the plurality of information sub-carriers with the information, populating the plurality of AIC sub-carriers with the AIC sub-carrier data, applying baseband processing to the information symbol, thereby producing a processed symbol, and transmitting the processed symbol.

20 Claims, 8 Drawing Sheets

SYSTEM AND METHOD FOR SIDELOBE SUPPRESSION IN COMMUNICATIONS SYSTEMS

This application claims the benefit of U.S. Provisional Application No. 61/091,879, filed on Aug. 26, 2008, entitled "Sidelobe Suppression Technique for OFDM Systems," which application is hereby incorporated herein by reference.

TECHNICAL FIELD

The present invention relates generally to digital communications, and more particularly to a system and method for sidelobe suppression in orthogonal frequency division multiplex (OFDM) communications systems.

BACKGROUND

Generally, in an OFDM communications system, a channel comprising a large number of sub-carriers over a frequency range is used to carry data. Frequencies within the channel may be referred to as in-band frequencies, and frequencies outside of the channel may be referred to as out-of-band frequencies. For example, if an OFDM communications system supports a plurality of channels, with a transmission occurring over one channel, then transmissions over the one channel are in-band transmissions with respect to the one channel, while transmissions occurring outside of a frequency range of the one channel are out-of-band transmissions with respect to the one channel.

Potentially, the OFDM communications system uses a number of different channels to allow communications by multiple communications devices operating in the OFDM communications system. The sub-carriers within a channel may be closely spaced and orthogonal to one another. The information (data and/or pilots) to be carried may be divided into multiple information streams with one information stream per sub-carrier. Each sub-carrier may be modulated with a conventional modulation scheme, such as quadrature amplitude modulation or phase shift keying.

In addition to the sub-carriers, a channel may include guard bands placed on the upper and lower ends of the channel frequency range, surrounding the frequency range of the sub-carriers. The guard bands may be used to help prevent signals in the channel from leaking out of the channel and causing interference to other communications devices in the OFDM communications system as well as electronic devices not in the OFDM communications system. For example, with the OFDM wireless communications system operating in a channel (or channels) with a frequency band adjacent to licensed spectrum, by regulation, the OFDM wireless communications system must not cause interference to electronic devices that are using the licensed spectrum. Additionally, the communications devices communicating over the channel (channels) should not cause interference to communications devices communicating over channels adjacent to the channel.

However, even with the use of guard bands, signals on the sub-carriers in the channel will leak through into adjacent channels or frequencies and may raise the signal level on out-of-band frequencies. This may negatively impact the performance of electronic devices operating in the out-of-band frequencies.

In co-assigned U.S. patent applications entitled "Ultra Wideband Interference Cancellation for Orthogonal Frequency Division Multiplex Transmitters by Protection-Edge Tones," U.S. patent application Ser. No. 11/173,840, filed Jul. 1, 2005, and "Narrow Band Interference Cancellation Technique for OFDM Transmitters," U.S. patent application Ser. No. 11/356,780, filed Feb. 17, 2006, which are incorporated herein by reference, a focus is placed on tone-nulling applications by controlling the interference level affecting narrow-band communications systems, which usually has a right to use the band. The techniques proposed may not have application in sidelobe suppression since an optimization range may be set only within the OFDM signal spectrum, and therefore, sidelobes may not be effectively suppressed.

In a technical paper by S. Brandes, I. Cosovic, and M. Schenell, entitled "Sidelobe Suppression in OFDM Systems by Insertion of Cancellation Carriers," IEEE Vehicular Technology Conference (VTC-2005-Fall), September 2005, which is incorporated herein by reference, a technique for sidelobe suppression is presented. However, the technique ignores the effects of a transmitter's many baseband operations, including cyclic prefix and transmit time-windowing. Furthermore, a simple sinc function is used in calculating the interference assuming a rectangular pulse shaping for OFDM symbol and no cyclic prefix applied. Therefore, the technique has limited application in OFDM communications systems having cyclic prefix and transmit time-windowing.

Therefore, what is needed is a system and method for sidelobe suppression in OFDM communications systems that is applicable to OFDM communications systems wherein transmitters perform a number of baseband operations on the information to be transmitted, including adding a cyclic prefix (or cyclic suffix) and using transmit time-windowing (or time-domain filtering).

SUMMARY OF THE INVENTION

These and other problems are generally solved or circumvented, and technical advantages are generally achieved, by embodiments of a system and method for sidelobe suppression in OFDM communications systems.

In accordance with an embodiment, a method for transmitting an information symbol having a plurality of information sub-carriers and a plurality of active interference cancellation (AIC) sub-carriers is provided. The method includes generating AIC sub-carrier data based on information to be transmitted, populating the plurality of information sub-carriers with the information, populating the plurality of AIC sub-carriers with the AIC sub-carrier data, applying baseband processing to the information symbol, thereby producing a processed symbol, and transmitting the processed symbol.

In accordance with another embodiment, a method for transmitting an orthogonal frequency division multiplex (OFDM) symbol having a plurality of information sub-carriers and a plurality of active interference cancellation (AIC) sub-carriers is provided. The method includes generating AIC sub-carrier data for the plurality of AIC sub-carriers, generating the OFDM symbol from the AIC sub-carrier data and the information, and transmitting the OFDM symbol. The AIC sub-carrier data are based on information to be conveyed in the OFDM symbol.

In accordance with another embodiment, a transmitter is provided. The transmitter includes an active interference cancellation (AIC) sub-carrier data calculation unit coupled to an information input, a domain conversion unit coupled to the AIC sub-carrier data calculation unit, a baseband unit coupled to the domain conversion unit, and a radio frequency circuit coupled to the baseband unit. The AIC sub-carrier data calculation unit calculates AIC sub-carrier data based on frequency-domain information provided by the information unit, the domain conversion unit converts frequency-domain information and AIC sub-carrier data into time-domain data, and the baseband unit adds a cyclic prefix or a cyclic suffix to the time-domain data and to apply time-domain windowing or time-domain filtering to the time-domain data. The radio frequency circuit filters and amplifies the time-domain data prior to transmission.

An advantage of an embodiment is that a general framework in which an optimization range is not constrained to be with in a range of the signal spectrum. Therefore, the optimization range may be selected so that sidelobes may also be covered, and hence optimized.

Another advantage of an embodiment is that the optimization techniques may also apply to OFDM communications systems that include a cyclic prefix, cyclic suffix, transmit time-windowing, and/or time-domain filtering. Therefore, the embodiment may be used for sidelobe suppression in any OFDM communications system.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 5b is a detailed view of a portion of the OFDM symbol of FIG. 5a;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely an IEEE 802.11a compliant OFDM wireless communications system. The invention may also be applied, however, to other forms of OFDM communications systems (both wireless and wireline), including IEEE 802.11g, IEEE 802.11n, HIPERLAN/2, digital radio systems (DAB/EUREKA 147, DAB+, Digital Radio Mondiale, HD Radio, T-DMB and ISDB-TSB), digital television (DVB-T), mobile television (DVB-H, T-DMB, ISDB-T and MediaFLO forward link), mobile broadband (Third Generation Partnership Project LTE), IEEE 802.16 (WiMAX), IEEE 280.20, IEE 802.16e (Mobile WiMAX), WiBro, WiMedia (ECMA 386), any forthcoming OFDM standards for TV White space, e.g., CogNeA, and so forth.

Figure 1:
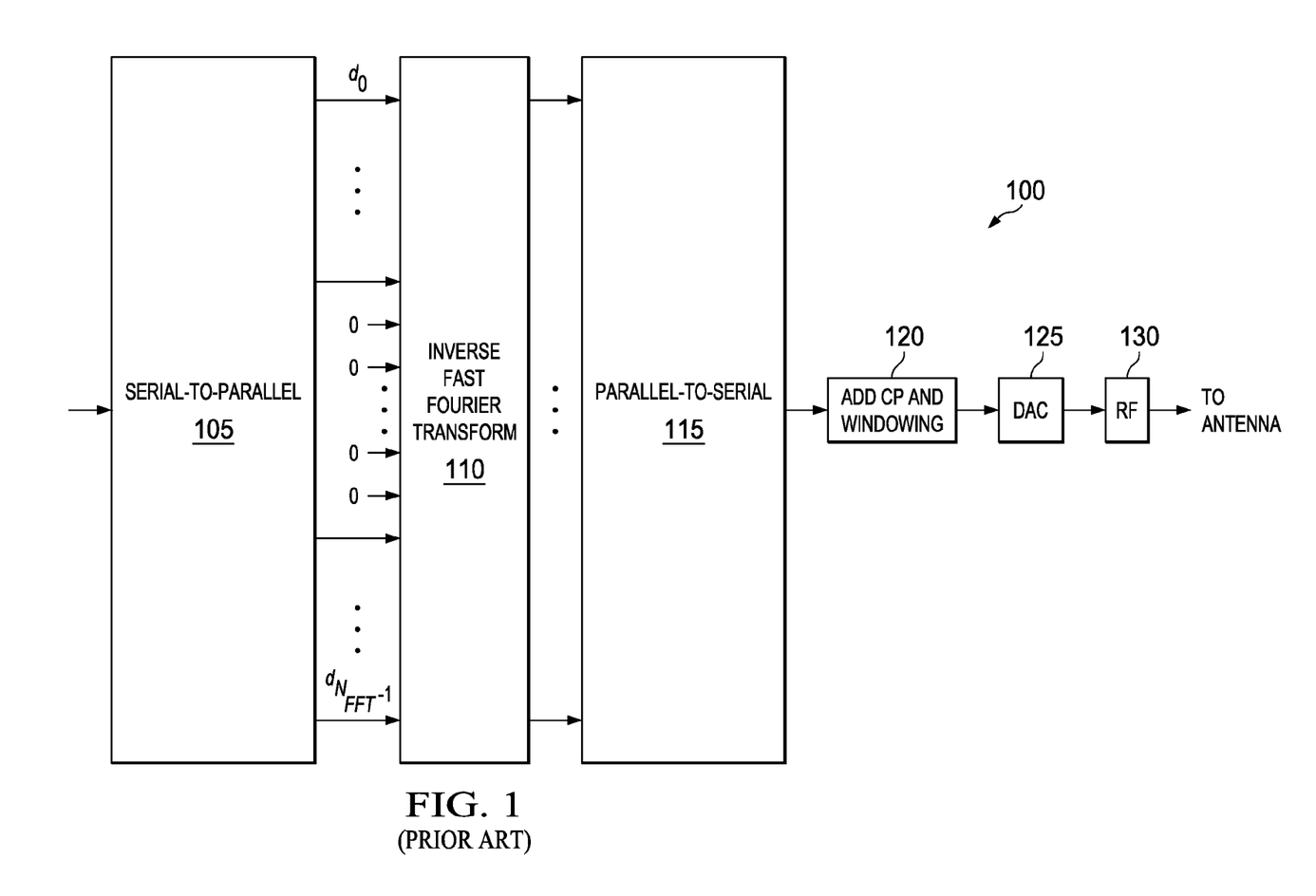
FIG. 1 is a diagram of a portion of a prior art transmitter of an OFDM communications system.

FIG. 1 illustrates a portion of a prior art transmitter 100 of an OFDM communications system. A baseband portion of OFDM transmitter 100 is shown in FIG. 1. Frequency-domain information to be transmitted may be provided to a serial-to-parallel (S/P) unit 105 that may be used to convert a serial information stream into multiple parallel information streams, with one parallel information stream for each data and pilot sub-carrier. The multiple parallel information streams may be provided to an inverse discrete Fourier transform unit 110, which preferably performs an inverse fast Fourier transform (IFFT) (shown in FIG. 1 as IFFT 110), on the multiple parallel information streams converting the frequency-domain information into time-domain information.

In addition to the multiple parallel information streams, zero tones may be inserted into one or more guard bands to help prevent signal from leaking from the data and pilot sub-carriers into spectrum outside of a frequency band of a channel. Zero tones may be inserted by providing zeroes (0) into certain inputs of IFFT unit 110. Typically, the zero tones may be inserted at the upper and lower frequencies edges of a channel. The number of zero tones and the size (frequency range) of the guard bands may be dependent on factors such as amount of isolation desired, desired data rate, and so forth.

After conversion into time-domain information, a parallel-to-serial (P/S) unit 115 may be used to serialize the time-domain information for transmission purposes. A cyclic prefix may be added to the serialized time-domain information and transmit time-domain windowing may be performed by an add cyclic prefix and windowing unit 120. A digital-to-analog converter (DAC) 125 may be used to convert the serialized time-domain information (possibly including a cyclic prefix and after transmit time-windowing) into an analog signal. The analog signal may be processed (such as, filtering, amplifying, and so on) by analog radio frequency (RF) circuitry 130 prior to transmission.

As discussed previously, the use of guard bands may help to reduce interference to electronic devices operating in spectrum adjacent to the frequency range of a channel. In general, the guard bands may be used to separate and isolate the information in the channel and to reduce the amount of out-of-band emission appearing in the spectrum outside of the frequency range of the channel.

However, some level of out-of-band emission occurs regardless of the presence of the guard bands, and unless sufficiently wide guard bands are used, at least some out-of-band emission will appear in the spectrum outside of the frequency range of the channel. But since the guard bands occupy bandwidth that may otherwise be used to carry information, exceedingly wide guard bands reduce the amount of available bandwidth in the OFDM communications system and are typically not used.

Instead of using zero tones, it may be possible to place active interference cancellation (AIC) sub-carrier data on a subset of sub-carriers in the guard bands. The use of the AIC sub-carrier data that combines destructively with, i.e., cancel, the out-of-band emission may result in a reduction in the total signal present in the guard bands, thereby reducing the out-of-band emissions.

Since the nature of the out-of-band emission may be dependent on the information carried in the sub-carriers, the AIC sub-carrier data may need to be computed dynamically as the information being carried changes.

The AIC sub-carrier data may be placed in a portion of the sub-carriers in the guard bands or all of the sub-carriers in the guard bands, depending on the amount of out-of-band emission cancellation desired, the amount of computation to be allocated to the computing of the AIC sub-carrier data, and so forth.

Figure 2:
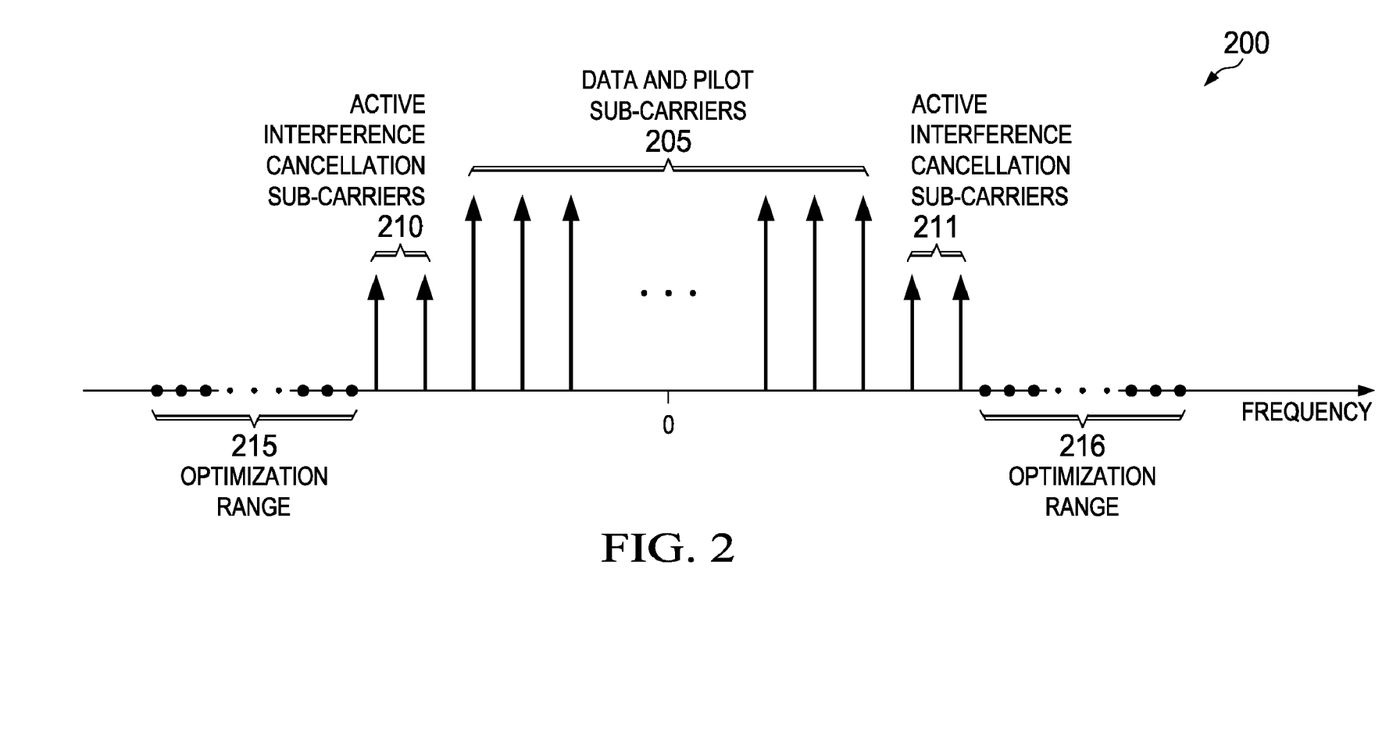
FIG. 2 is a diagram of a structure of sub-carriers in an OFDM symbol.

FIG. 2 illustrates a structure of sub-carriers in a channel 200 in an OFDM wireless communications system. Channel 200 may be used by electronic devices operating in an OFDM communication system to transmit ODFM symbols. Channel 200 includes a number of data and pilot sub-carriers 205 intended to convey sub-carrier data that contain information to be transmitted. Channel 200 also includes AIC sub-carriers at frequencies at the upper and lower edges of the channel spectrum, with AIC sub-carriers 210 at the lower edge and AIC sub-carriers 211 at the upper edge. AIC sub-carrier data may be placed in the AIC sub-carriers. The AIC sub-carrier data present in the AIC sub-carriers may cancel out the out-of-band emission resulting from the information conveyed in data and pilot sub-carriers 205.

Also shown are optimization ranges at frequencies at the lower edge of the channel spectrum (optimization range 215) and at upper edge of the channel spectrum (optimization range 216). In the optimization ranges 215 and 216, zero tones may also be transmitted to provide further separation or isolation of information carried in channel 200 from spectrum used by other electronic devices.

Although FIG. 2 illustrates two sub-carriers per AIC sub-carrier (AIC sub-carriers 210 and AIC sub-carriers 211) located at the upper and the lower edges of the frequency spectrum of channel 200, an actual number of sub-carriers per AIC sub-carrier used in an actual OFDM communication system may be dependent on factors such as available bandwidth, desired data bandwidth, available computational ability to compute the AIC sub-carrier data, desired degree of signal leakage cancellation, and so forth. Therefore, the illustrative example of two sub-carriers per AIC sub-carrier should not be construed as being limiting to either the scope or the spirit of the embodiments.

Figure 3A:
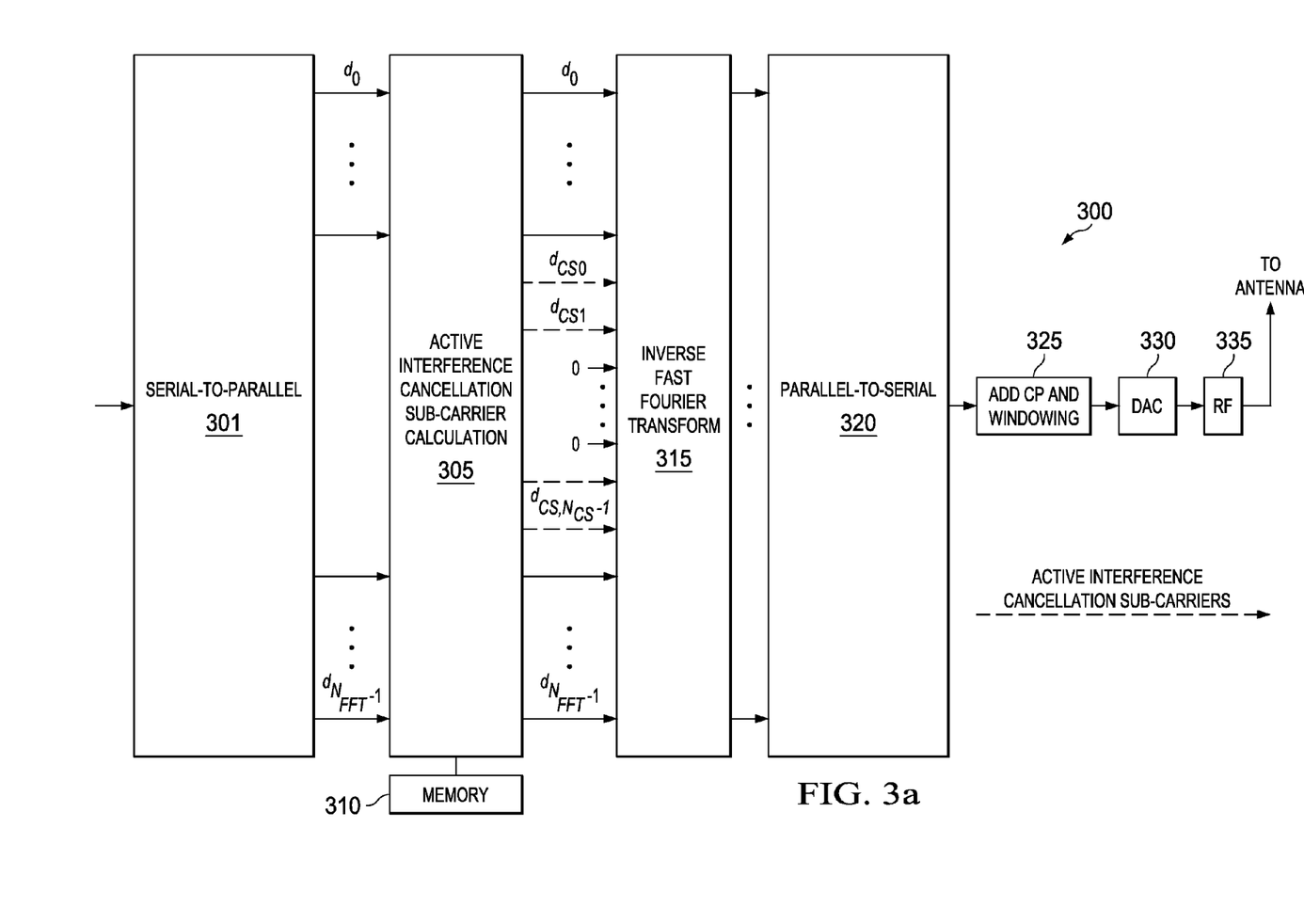
FIG. 3a is a diagram of a portion of a transmitter of an OFDM communications system that uses the sidelobe suppression method described herein.

FIG. 3a illustrates a portion of a transmitter 300 of an OFDM communications system. A baseband portion of OFDM transmitter 300 is shown in FIG. 3. OFDM transmitter 300 includes S/P unit 301 to convert a serial information stream into multiple parallel information streams. The multiple parallel information streams may be provided to an AIC sub-carrier calculation (CSC) unit 305. CSC unit 305 may be used to compute the AIC sub-carrier data to be inserted into AIC sub-carriers to deconstructively combine with the out-of-band-emission due to information contained in data and pilot sub-carriers.

CSC unit 305 may compute the AIC sub-carrier data based on the multiple parallel information streams as well as values that may be calculated a priori and stored in a memory 310.

Examples of values that may be calculated a priori may include contributions of each sub-carrier on a particular frequency, frequency-domain signals over an optimization range due to data and pilot sub-carriers and AIC sub-carriers, and so forth. The use of values computed a priori may help to reduce real-time computational requirements.

The multiple parallel information streams and the AIC sub-carrier data may be provided to IFFT unit 315 to convert the frequency-domain information and the AIC sub-carrier data into time-domain information. After conversion into time-domain information, P/S unit 320 may be used to serialize the time-domain information for transmission purposes. A cyclic prefix (or a cyclic suffix) may be added to the serialized time-domain information and transmit time-windowing (or time-domain filtering) may be performed by add cyclic prefix and windowing unit 325. DAC 330 may be used to convert the serialized time-domain information (possibly including a cyclic prefix/suffix and after transmit time-domain windowing or time-domain filtering) into an analog signal. The analog signal may be processed (such as, filtering, amplifying, and so on) by analog radio frequency (RF) circuitry 335 prior to transmission.

Figure 3B:
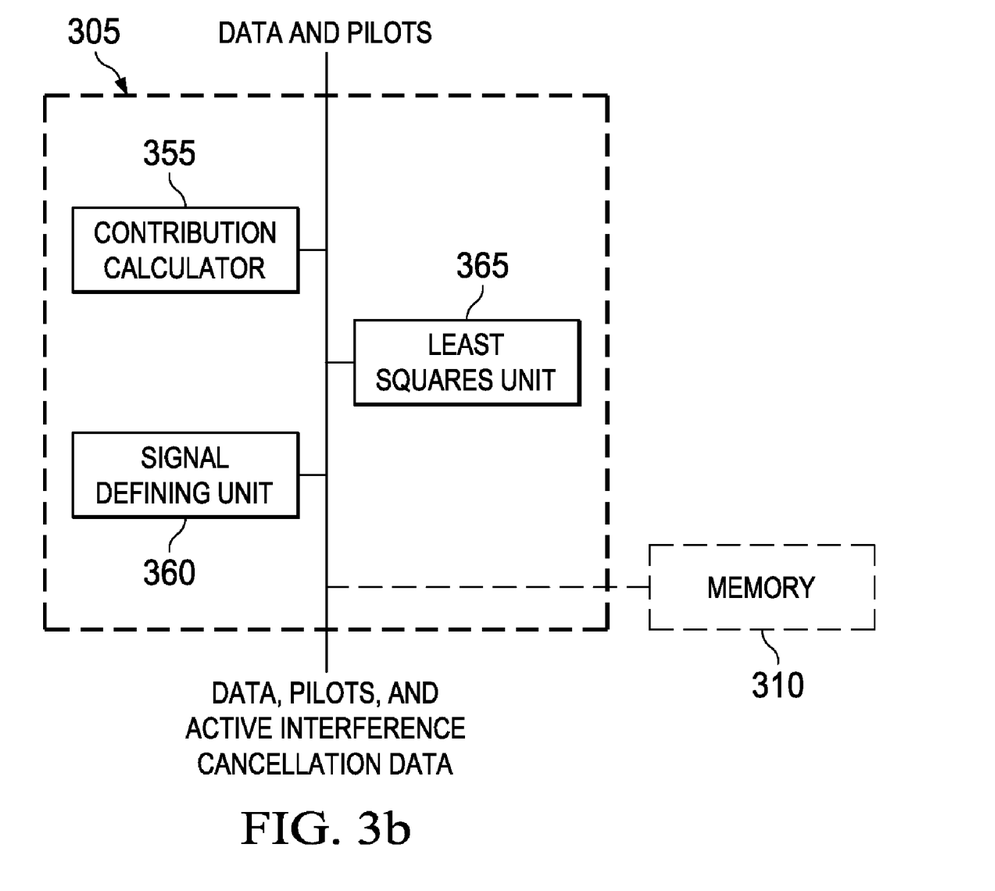
FIG. 3b is a diagram of a detailed view of an active interference cancellation (AIC) sub-carrier calculation unit.

FIG. 3b illustrates a detailed view of CSC unit 305 and memory 310. As discussed previously, CSC unit 305 may be used to compute AIC sub-carrier data based on the multiple parallel information streams (i.e., the data and pilots) as well as values that may be calculated a priori and stored in memory 310. CSC unit 305 includes a contribution calculator 355 that may be used to calculate the contribution of each data and pilot sub-carrier on a specified frequency. For example, contribution calculator 355 may calculate the contribution of each data and pilot tone due to signal leakage onto the out-of-band frequencies. CSC unit 305 also includes a signal defining unit 360, which may be used to define a matrix that may be used to calculate frequency-domain signals over an optimization range due to data and pilot tones, denoted $P_0$, and a matrix that may be used to calculate a frequency-domain signal over the optimization range due to AIC sub-carrier data, denoted $P_1$. Both contribution calculator unit 355 and signal defining unit 360 may perform their operations prior to normal operations of OFDM transmitter 300 and store their results (i.e., $P_0$ and $P_1$) in memory 310 for later use.

CSC unit 305 also includes a least squares unit 365. Least squares unit 365 may implement one of a variety of least squares problem solving algorithms. Least squares unit 365 may make use of a least squares problem solving algorithm along with information produced by contribution calculator unit 355 and signal defining unit 360 to compute the AIC sub-carrier data. A detailed description of the use of least squares problem solving algorithm to compute the AIC sub-carrier data is provided below.

Figure 4:
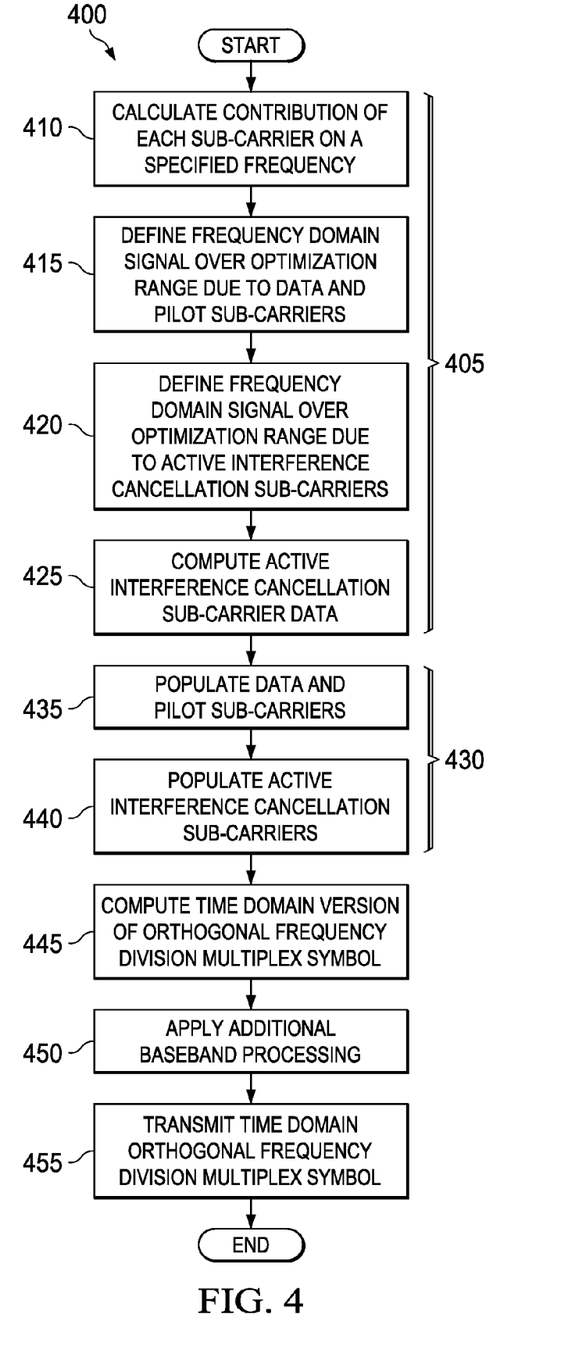
FIG. 4 is a flow diagram of transmitter operations in the transmission of an OFDM symbol in an OFDM communications system.

FIG. 4 illustrates a flow diagram of transmitter operations 400 in the transmission of an OFDM symbol in an OFDM communications system. Transmitter operations 400 may be indicative of operations taking place in a first communications device communicating with a second communications device. The communications devices may be a controller communicating with a mobile device or a mobile device communicating with a controller. Transmitter operations 400 may take place each time the first communications device has information to transmit to the second communications device and generates an OFDM symbol(s) to transmit. Furthermore, transmitter operations 400 may take place when the first communications device transmits control signaling to the second communications device, which may not include any additional information.

Transmitter operations 400 may be a multi-stage operation. A first stage comprises the generation of AIC sub-carrier data for information to be carried on each OFDM symbol (block 405). As discussed previously, the AIC sub-carrier data for an OFDM symbol may be based on the information carried in the OFDM symbol. Therefore, the AIC sub-carrier data may need to be computed dynamically for each OFDM symbol and cannot be calculated a priori and stored at the first communications device. However, certain portions of calculations may be precomputed and stored in a memory at the first communications device for subsequent use. The precomputing of some of the calculations may help to reduce dynamic computational requirements.

In order to discuss the generation of the AIC sub-carrier data, a mathematical model may need to be developed. Let d denote frequency-domain signals in the OFDM symbol, with d expressible as:

$$d = [d_0, d_1, \ldots, d_{N_{FFT}-1}]^T \quad (1)$$

where $N_{FFT}$ is the FFT length, and $d_k$ represents the frequency-domain signal on the k-th carrier ($k=0, 1, \ldots, N_{FFT}$). d may contain both data and pilot (information) carried in the OFDM symbol as well as zero tones and the AIC sub-carrier data.

Generally, the determination of the exact interference on a particular frequency (particularly in a sidelobe or optimization range) due to each data and pilot sub-carrier is used in the generation of the AIC sub-carrier data. A preferred way to do this is to express all baseband operations of the transmitter in matrix operations. The baseband operations include:

1. Zero-padding in frequency-domain for a time-domain signal interpolation by a factor of $R_1$ (an integer typically $R_1 \geq 2$). Placing zeros in the frequency-domain as described here and taking an IFFT operation as described in #2 below may be an effective way of performing time-domain interpolation. The interpolation operation effectively allows for the evaluation of the interference level on a wider frequency range (typically much wider than the regular bandwidth of the channel). With $R_1$ oversampling, it is possible to accurately model the signal level in a frequency range that is $R_1$ times wider than in the case without interpolation (i.e., $R_1=1$). The zero-padding operation may be represented mathematically by a matrix D which is expressible as:

$$D = \begin{bmatrix} I_{N_{FFT}/2} & 0_{N_{FFT}/2 \times N_{FFT}/2} \\ \hline 0_{(R_1-1)N_{FFT} \times N_{FFT}/2} & 0_{(R_1-1)N_{FFT} \times N_{FFT}/2} \\ \hline 0_{N_{FFT}/2 \times N_{FFT}/2} & I_{N_{FFT}/2} \end{bmatrix} \in \mathbb{R}^{R_1 N_{FFT} \times N_{FFT}}. \quad (2)$$

where $I_n$ denotes an n×n identity matrix and $0_{n \times m}$ is the n×m zero matrix.

2. ($R_1 N_{FFT}$)-point IFFT: This operation may be represented mathematically by a matrix $F_{R_1 N_{FFT}}{}^H \in C^{R_1 N_{FFT} \times R_1 N_{FFT}}$ where $A^H$ represents the Hermitian transpose (or conjugate transpose) of matrix A. Here $F_{R_1 N_{FFT}}$ represents a $R_1 N_{FFT} \times R_1 N_{FFT}$ complex-valued matrix for a $R_1 N_{FFT}$-point FFT matrix, whose (n, m) element is given by:

$$F_{R_1 N_{FFT}}(n, m) = \frac{1}{\sqrt{R_1 N_{FFT}}} \exp\left(-\frac{j2\pi nm}{R_1 N_{FFT}}\right) \quad (3)$$

where $n, m = 0, 1, \ldots, R_1 N_{FFT} - 1$.

3a. Adding cyclic prefix of length $R_1 N_{CP}$: This operation may be mathematically represented by a matrix $C \in \mathbb{R}^{R_1(N_{FFT}+N_{CP}) \times R_1 N_{FFT}}$. C is expressible as:

$$C = \begin{bmatrix} 0_{R_1 N_{CP} \times R_1(N_{FFT}-N_{CP})} & | & I_{R_1 N_{CP}} \\ \hline & I_{R_1 N_{FFT}} & \end{bmatrix}. \quad (4)$$

In an alternative to adding a cyclic prefix, a cyclic suffix may be added.

3b. Adding zero padded suffix (ZPS) of length $R_1 N_{CP}$: For ZP-OFDM (zero-padding OFDM, see reference, B. Muquet et al. "Cyclic prefixing or zero padding for wireless multicarrier transmissions?," IEEE Trans. Communications, December 2002, which is incorporated herein by reference). The adding cyclic prefix of length $R_1 N_{CP}$ operation (discussed as #3a above) may be replaced by the following operation: this operation may be mathematically represented by a matrix $C \in \mathbb{R}^{R_1(N_{FFT}+N_{CP}) \times R_1 N_{FFT}}$. C is expressible as:

$$C = \begin{bmatrix} I_{R_1 N_{FFT}} \\ \hline 0_{R_1 N_{CP} \times R_1 N_{FFT}} \end{bmatrix}. \quad (4')$$

4. Time-domain windowing: This operation is denoted by a diagonal matrix W. W is expressible as:

$$W = \mathrm{diag}(w_0, w_1, \ldots, w_{R_1(N_{FFT}+N_{CP})-1}) \in \mathbb{R}^{R_1(N_{FFT}+N_{CP}) \times R_1(N_{FFT}+N_{CP})}, \quad (5)$$

where $\mathrm{diag}(a_0, a_1, \ldots, a_{n-1})$ is an n×n diagonal matrix with $a_0, a_1, \ldots, a_{n-1}$ in the diagonal. In an alternative to time-domain windowing, time-domain filtering may be applied.

5. ($R_2 N_{FFT}$)-point FFT: This operation may be mathematically represented by a matrix $F_{R_2 N_{FFT}} \in C^{R_2 N_{FFT} \times R_2 N_{FFT}}$. The parameter $R_2 \geq R_1$, for example, $R_2 = 2^n R_1$ (for some integer $n \geq 1$). The (n, m) element of matrix $F_{R_2 N_{FFT}}$ is given by:

$$F_{R_2 N_{FFT}}(n, m) = \frac{1}{\sqrt{R_2 N_{FFT}}} \exp\left(-\frac{j2\pi nm}{R_2 N_{FFT}}\right) \quad (6)$$

where $n, m = 0, 1, \ldots, R_2 N_{FFT} - 1$.

Then, the overall baseband operation may be written as follows:

$$P = F_{R_2 N_{FFT} \times R_1(N_{FFT}+N_{CP})} W C F_{R_1 N_{FFT}}{}^H D \in \mathbb{C}^{R_2 N_{FFT} \times N_{FFT}} \quad (7)$$

where $F_{R_2 N_{FFT} \times R_1(N_{FFT}+N_{CP})}$ is a $R_2 N_{FFT} \times R_1(N_{FFT}+N_{CP})$ sub-matrix of $F_{R_2 N_{FFT}}$, consisting of the first $R_1(N_{FFT}+N_{CP})$ column vectors of $F_{R_2 N_{FFT}}$. With the matrix P, the frequency-domain signal on an extended frequency range may be expressed as:

$$s = Pd. \quad (8)$$

The extended frequency range and its resolution is determined by $R_1$ and $R_2$. With $R_1$ oversampling, the extended frequency covers $R_1$ times wider frequency range than the case without interpolation (i.e., $R_1=1$). And the ratio between $R_1$ and $R_2$ determines the frequency-domain resolution: There are $R_2/R_1$ frequency bins per sub-carrier. Also matrix P is usually pre-calculated offline and only necessary rows of matrix P are saved in a memory for subsequent use in generating the AIC sub-carrier data.

In general, a variable vector is a vector that is being optimized over.

Additionally, sub-carrier index vectors may be defined:

Data and pilot sub-carrier index vector: a vector indicating sub-carriers on which data and pilot sub-carriers are transmitted, denoted $$j_{DPS} \subset \{0,1,\ldots,N_{FFT}-1\}.$$

AIC sub-carrier index vector: a vector indicating AIC sub-carriers, denoted $$j_{CS} \subset \{0,1,\ldots N_{FFT}-1\}.$$

Optimization range vector: a vector indicating optimization range, denoted $$j_{opt} \subset \{0,1,\ldots,R_2 N_{FFT}-1\}.$$

Additionally, let:

P(i,j) is the submatrix of matrix P that consists of elements of matrix P that are crossed by the rows indicated by index vector i and the columns indicated by index vector j.

d(j) is a subvector of vector d that is consisted of elements indicated by index vector j.

Then, the frequency-domain signal over the optimization range due to the data and pilot sub-carriers may be expressed as:

$$b = P_0 d_{DPS}, \quad (9)$$

where $P_0 = P(i_{opt}, j_{DPS})$ and $d_{DPS} = d(j_{DPS})$.

Transmitter operations 400 may begin with the transmitter calculating the contribution of each sub-carrier data on a specified frequency (block 410). For example, the contribution of each data and pilot sub-carrier data within the OFDM symbol on a specified frequency, for example, the out-of-band frequencies, may be calculated. The contribution of each sub-carrier data on a specified frequency may be calculated by evaluating Equation (7) shown above. The evaluation of Equation (7) may be performed a priori and stored in a memory for subsequent use.

From the calculation of P (Equation (7)), the transmitter may define a frequency-domain signal over an optimization range due to data and pilot sub-carrier data, denoted $P_0$ (block 415) and a frequency-domain signal over the optimization range due to AIC sub-carrier data, denoted $P_1$ (block 420). $P_0$ is as shown above and $P_1 = P(i_{opt}, j_{CS})$. Both $P_0$ and $P_1$ may be computed a priori and stored in a memory for subsequent use.

The transmitter may then compute the AIC sub-carrier data (block 425). The AIC sub-carrier data, denoted by vector $d_{CS}$, may be calculated as follows:

$$d_{CS} = \underset{x}{\operatorname{argmin}} \|P_1 x + b\|^2, \quad (10)$$

where $$P_1 = P(i_{opt}, j_{CS}), \|y\|^2 = \sum_i |y_i|^2$$

represents the 2-norm of vector y. The solution to the least-squares (LS) optimization problem of Equation (10) is given by:

$$d_{CS} = -(P_1^H P_1)^{-1} P_1^H b \quad (11)$$
$$= -(P_1^H P_1)^{-1} P_1^H P_0 d_{DPS}.$$

As expressed in Equation (10), the computing of the AIC sub-carrier data may involve the solving of an unconstrained least-squares problem and a variety of different algorithms suitable for solving lease squares problems may be used. However, a solution produced by solving the unconstrained least-squares problem sometimes leads to a situation wherein the magnitude of the AIC sub-carrier data may be large relative to the magnitudes of the data and pilot sub-carrier data. A possible solution may be to introduce a constraint to the LS optimization problem.

Equation (10) may be re-written as a damped least-squares problem as:

$$d_{CS} = \underset{x}{\operatorname{argmin}} \|P_1 x + b\|^2 + \lambda \|x\|^2. \quad (12)$$

where λ is an optimization parameter and I is an identity matrix. The solution to the damped LS optimization problem of Equation (12) is given by:

$$d_{CS} = -(P_1^H P_1 + \lambda I)^{-1} P_1^H b \quad (13)$$
$$= -(P_1^H P_1 + \lambda I)^{-1} P_1^H P_0 d_{DPS}.$$

Equation (10) may also be re-written as a constrained least-squares problem as:

$$d_{CS} = \underset{x}{\operatorname{argmin}} \|P_1 x + b\|^2 \quad (14)$$
$$\text{subject to } \|x\|^2 \leq \alpha^2.$$

where α is a constraint. Equation (14), a constrained least-squares problem may be solved by a variety of algorithms, such as shown in G. H. Golub and C. F. Van Loan, *Matrix Computations*, 3rd Ed., Oct. 15, 1996, pp. 580-582, which is incorporated herein by reference, in which a standard root-finding technique, such as Newton's method, is involved.

Since the AIC sub-carrier data are dependent on the data and pilot sub-carrier data, it may not be possible to compute the AIC sub-carrier data a priori. Instead, the AIC sub-carrier data may need to be computed for each OFDM symbol to be transmitted. However, the dynamic computational requirements of the transmitter may be reduced by precomputing some of the values (such as, P, $P_0$, and $P_1$) required in the computing of the AIC sub-carrier data a priori and storing them for subsequent use.

With the AIC sub-carrier data computed (block 425), the transmitter may generate the OFDM symbol in a second stage of transmitter operations 400 (block 430). Generating the OFDM may include populating the data and pilot sub-carrier data into the data and pilot sub-carriers of the OFDM symbol (block 435) as well as populating the AIC sub-carrier data into the AIC sub-carriers (block 440).

With the OFDM symbol generated, a final stage of transmitter operations 400 may begin. The transmitter may compute a time-domain version of the OFDM symbol (block 445). For example, the transmitter may use an inverse Fourier transform to convert the OFDM symbol into a time-domain version. Preferably, an inverse Fast Fourier transform (IFFT) may be used. Additional baseband processing may also be performed on the time-domain version of the OFDM symbol, including adding a cyclic prefix (or cyclic suffix) and applying time-domain windowing (or time-domain filtering) (block 450).

The time-domain version of the OFDM symbol (including the additional baseband processing) may be transmitted (block 455). The transmitting of the OFDM symbol may include additional operations such as serializing the time-domain version of the OFDM symbol, conversion into an analog signal, filtering, amplifying, and so forth. Transmitter operations 400 may then terminate.

Figure 5A:
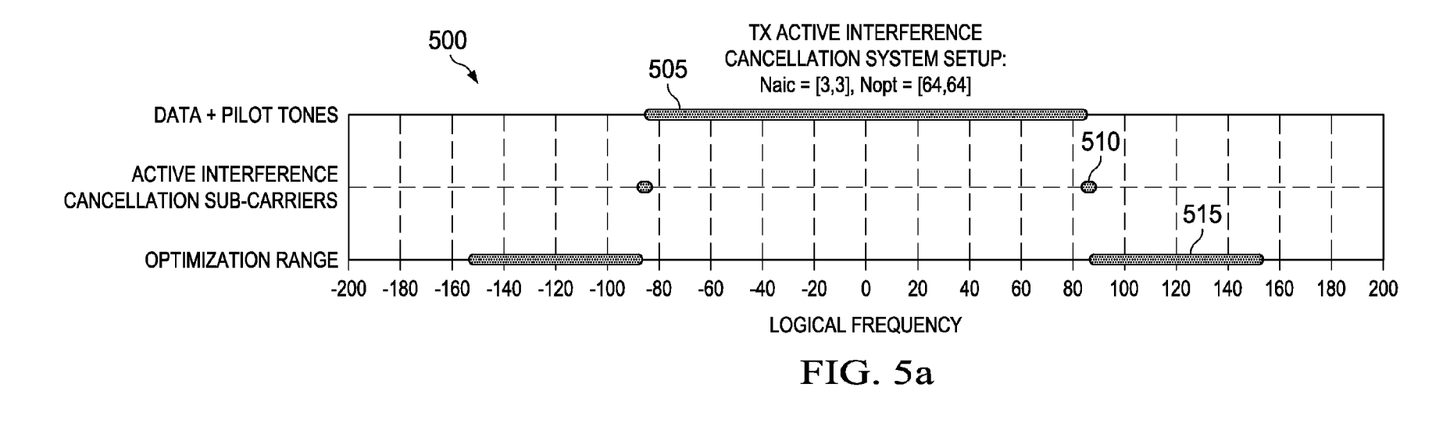
FIG. 5a is a frequency-domain plot of an OFDM symbol with sidelobe suppression using AIC sub-carrier data.
Figure 5B:
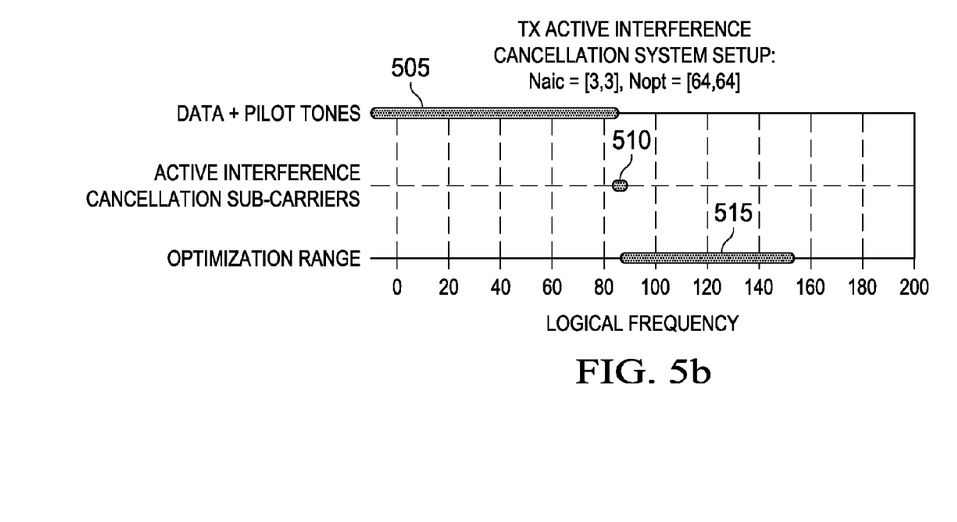

FIG. 5a illustrates a frequency-domain plot of a channel 500 with sidelobe suppression using AIC sub-carrier data. Channel 500 includes a number of data and pilot sub-carriers 505. Outside of a frequency range containing data and pilot sub-carriers 505, AIC sub-carriers 510 may be used to convey AIC sub-carrier data. The number of AIC sub-carriers 510 may be dependent on a desired amount of sidelobe suppression, available sub-carriers, available computation resources, and so forth. Channel 500 also includes an optimization range of sub-carriers 515. In general, optimization range of sub-carriers 515 convey zero tones to permit sidelobe suppression to occur. Additionally, optimization range of sub-carriers 515 also provide isolation for channel 500, as well as for electronic devices operating in spectrum adjacent to channel 500. FIG. 5b illustrates a detailed view of a portion of channel 500.

Figure 6:
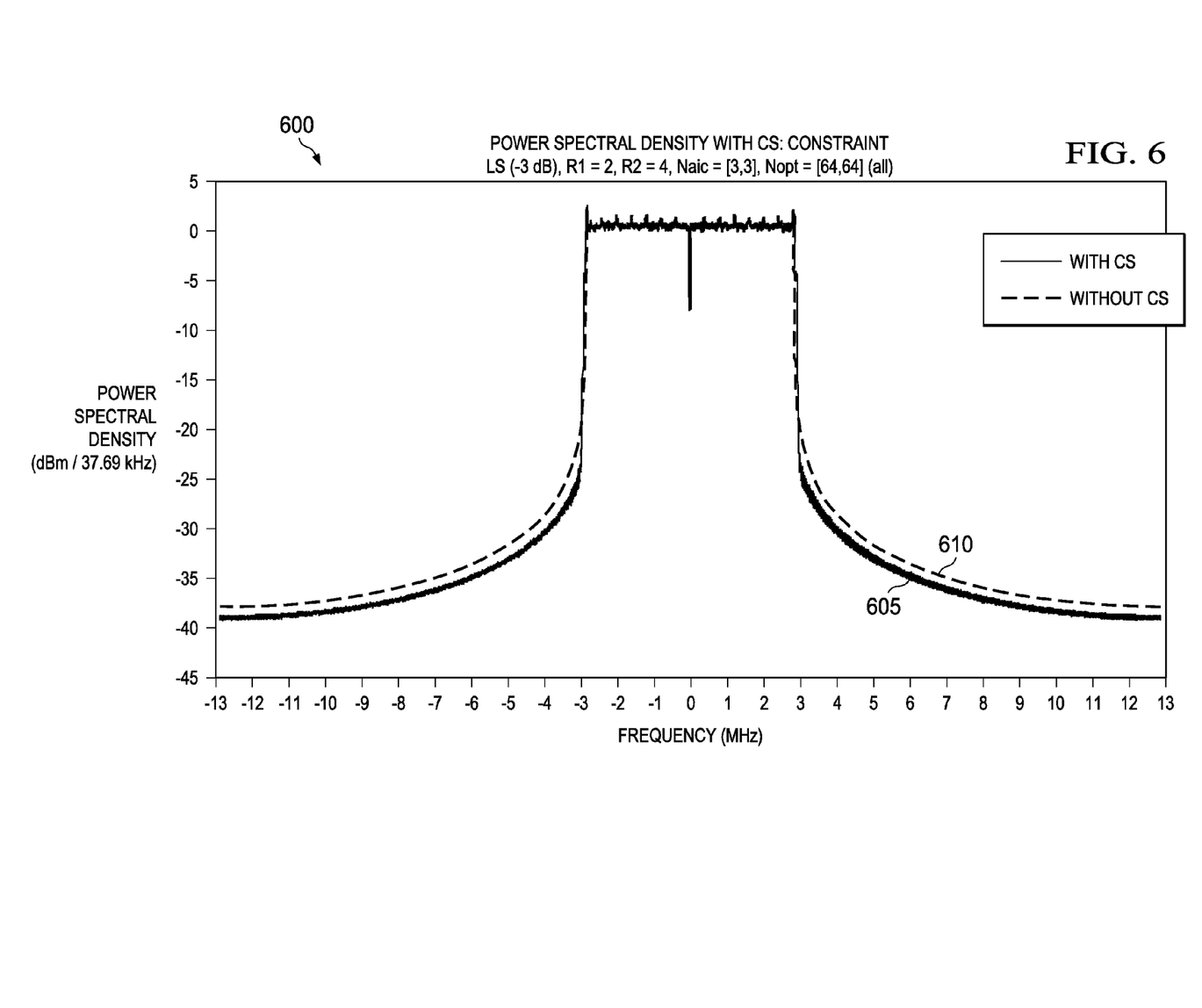
FIG. 6 is a data plot of power spectral density (PSD) over frequency of a transmitted OFDM symbol with and without sidelobe suppression using AIC sub-carrier data.

FIG. 6 illustrates a data plot 600 of power spectral density (PSD) over frequency of transmitted OFDM signal with and without sidelobe suppression using AIC sub-carrier data. A first trace 605 represents PSD for a transmitted OFDM symbol with sidelobe suppression using AIC sub-carrier data, wherein the AIC sub-carrier data are computed by solving a constrained least squares formulation (i.e., Equation (14)) and a second trace 610 represents PSD for a transmitted OFDM symbol without sidelobe suppression.

Data plot 600 comprises data derived through simulation of an OFDM communications system with the following OFDM parameters:

| Parameter | Value |
| --- | --- |
| Inter-carrier spacing, $\Delta f$ | 32.667 kHz |
| FFT period, $T_{FFT}$ | 30.61 μs |
| Total number of sub-carriers, $N_{FFT}$ | 192 |
| Number of data sub-carriers, $N_{DSC}$ | 164 |
| Number of pilot sub-carriers, $N_{PSC}$ | 6 |
| Number of guard sub-carriers, $N_{GSC}$ | 22 |
| Cyclic prefix length, non-preamble | 8 |
| $T_{SYM}$, non-preamble | 31.89 μs |
| Cyclic prefix length, preamble | 16 |
| $T_{SYM}$, preamble | 33.16 μs |
| Multipath protection | 1.28 μs |
| Signal bandwidth | 5.59 MHz |

Additional parameters include:
Number of AIC sub-carriers, $N_{CS}$=[3, 3] (three AIC sub-carriers on each side).
Optimization range of sub-carriers spans 64 sub-carriers on each side of sidelobe (see FIG. 5).
Constraint parameter α was set such at an average energy on AIC sub-carrier data are 3 dB below that of data and pilot tones to avoid a peak in spectrum.
As shown in FIG. 6, the use of AIC sub-carrier data resulted in a seven (7) to eight (8) dB suppression of PSD at +/−3 MHz when compared to not using AIC sub-carrier data.

Figure 7:
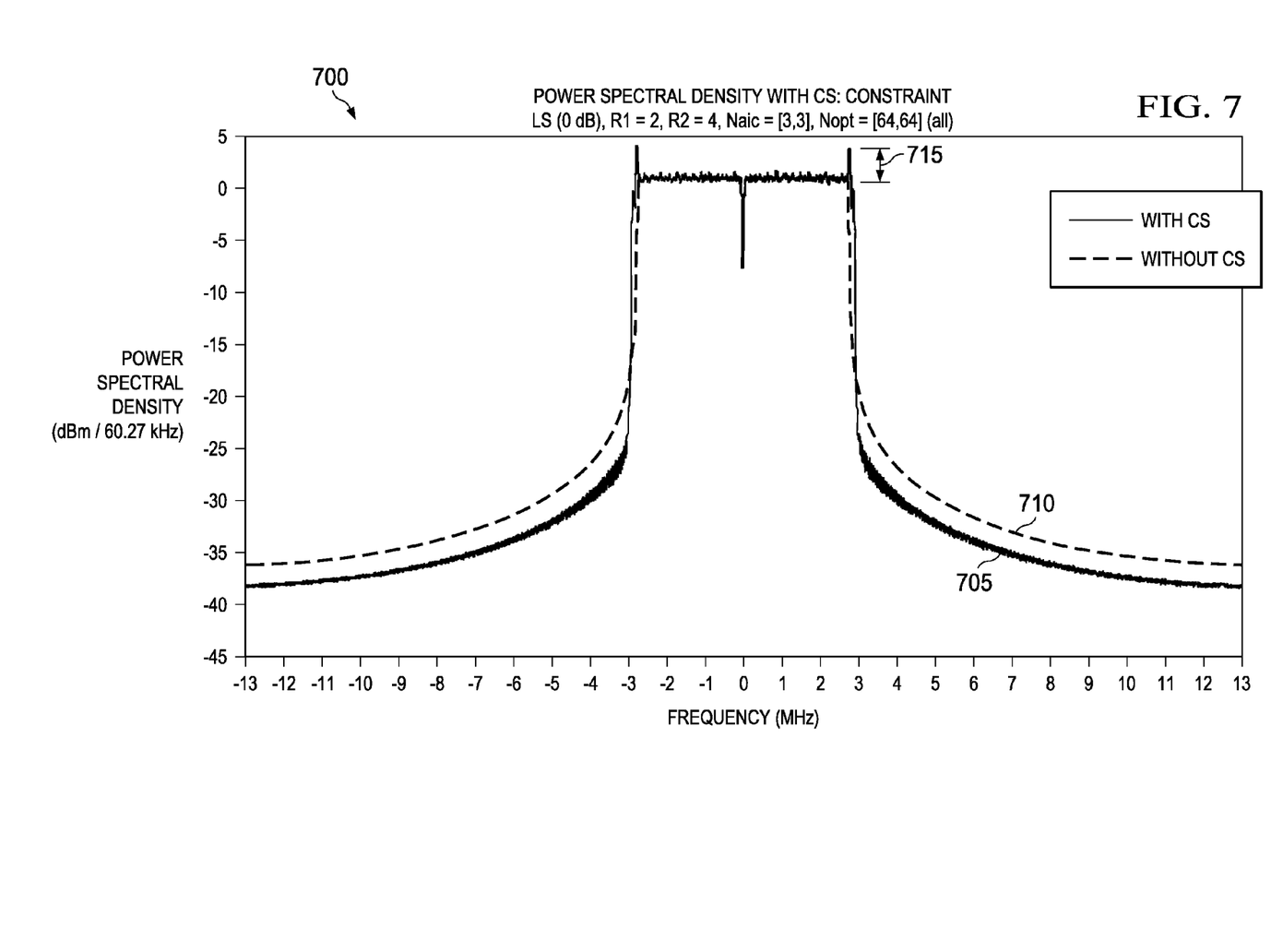
FIG. 7 is a data plot of power spectral density (PSD) over frequency of a transmitted OFDM symbol with and without sidelobe suppression using AIC sub-carrier data.

FIG. 7 illustrates a data plot 700 of power spectral density (PSD) over frequency of transmitted OFDM signal with and without sidelobe suppression using AIC sub-carrier data. A first trace 705 represents PSD for a transmitted OFDM symbol with sidelobe suppression using AIC sub-carrier data, wherein the AIC sub-carrier data are computed by solving a constrained least squares formulation (i.e., Equation (14)) and a second trace 710 represents PSD for a transmitted OFDM symbol without sidelobe suppression.

Data plot 700 comprises data derived through simulation of an OFDM communications system with the following OFDM parameters:

| Parameter | Value |
| --- | --- |
| Inter-carrier spacing, $\Delta f$ | 53.57 kHz |
| FFT period, $T_{FFT}$ | 18.67 μs |
| Total number of sub-carriers, $N_{FFT}$ | 128 |
| Number of data sub-carriers, $N_{DSC}$ | 98 |
| Number of pilot sub-carriers, $N_{PSC}$ | 4 |
| Number of guard sub-carriers, $N_{GSC}$ | 26 |
| Cyclic prefix length, non-preamble | 8 |
| $T_{SYM}$, preamble | 19.83 μs |
| Cyclic prefix length, preamble | 32 |
| $T_{SYM}$, non-preamble | 23.34 μs |
| Multipath protection | 1.16 μs |
| Signal bandwidth | 5.52 MHz |

As shown in FIG. 7, the use of AIC sub-carrier data resulted in a seven (7) to eight (8) dB suppression of PSD at +/−3 MHz when compared to not using AIC sub-carrier data.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:
1. A method for transmitting an information symbol having a plurality of information sub-carriers and a plurality of active interference cancellation (AIC) sub-carriers, the method comprising:
generating AIC sub-carrier data based on information to be transmitted;
populating the plurality of information sub-carriers with the information;
populating the plurality of AIC sub-carriers with the AIC sub-carrier data;
applying baseband processing to the information symbol, thereby producing a processed symbol, wherein applying baseband processing to the OFDM symbol comprises:
interpolating the OFDM symbol;
computing a ($R_1 N_{FFT}$)-point inverse Fourier transform of the OFDM symbol; and
computing a ($R_2 N_{FFT}$)-point Fourier transform of the OFDM symbol, where $R_1$ and $R_2$ are integer values, with $R_2 \geq R_1$, and $N_{FFT}$ is the length of the inverse Fourier and Fourier transforms; and transmitting the processed symbol.

2. The method of claim 1, wherein applying baseband processing to the OFDM symbol further comprises:

applying a cyclic prefix or cyclic suffix to the OFDM symbol; and applying time-domain windowing or time-domain filtering to the OFDM symbol.

3. A method for transmitting an information symbol having a plurality of information sub-carriers and a plurality of active interference cancellation (AIC) sub-carriers, the method comprising:

generating AIC sub-carrier data based on information to be transmitted, wherein generating AIC sub-carrier data comprises computing the AIC sub-carrier data based on a contribution of each information sub-carrier in the OFDM symbol on frequencies in an optimization zone;

populating the plurality of information sub-carriers with the information;

populating the plurality of AIC sub-carriers with the AIC sub-carrier data;

applying baseband processing to the information symbol, thereby producing a processed symbol; and transmitting the processed symbol.

4. The method of claim 3, wherein generating AIC sub-carrier data further comprises defining signals over the optimization range due to the information sub-carriers and the AIC sub-carriers.

5. The method of claim 3, wherein generating AIC sub-carrier data comprises:

calculating a contribution of each information sub-carrier on frequencies in the optimization zone;

defining a first signal over an optimization range due to information sub-carriers;

defining a second signal over the optimization range due to AIC sub-carriers; and computing AIC sub-carrier data based on the contribution, the first signal, and the second signal.

6. The method of claim 5, wherein the contribution of each information sub-carrier on frequencies in the optimization zone, the first signal, and the second signal are precomputed and stored for subsequent use.

7. The method of claim 5, wherein calculating a contribution comprises evaluating:

$$P = F_{R_2 N_{FFT} \times R_1(N_{FFT} + N_{CP})} W C F_{R_1 N_{FFT}}^H D \in \mathbb{C}^{R_2 N_{FFT} \times N_{FFT}}$$

for x, where P is a matrix of a contribution of each information sub-carrier on frequencies in the optimization zone; $F_{R_2 N_{FFT}}$ is a matrix of an ($R_2 N_{FFT}$)-point Fourier transform operation; $F_{R_2 N_{FFT} \times R_1(N_{FFT}+N_{CP})}$ is a $R_2 N_{FFT} \times R_1(N_{FFT}+N_{CP})$ submatrix of $F_{R_2 N_{FFT}}$, consisting of the first $R_1(N_{FFT}+N_{CP})$ column vectors of $F_{R_2 N_{FFT}}$; W is a diagonal matrix of a time-domain windowing operation; C is matrix indicating an addition of a cyclic prefix; $F_{R_1 N_{FFT}}^H$ is a matrix of an ($R_1 N_{FFT}$)-point inverse Fourier transform operation; x is a variable vector for AIC sub-carrier data; D is a matrix of a frequency-domain zero padded time-domain signal oversampled by a factor of $R_1$; $R_2$ is greater than $R_1$; n is an integer greater than or equal to one (1); $N_{FFT}$ is the length of the Fourier transform; and $N_{CP}$ is the length of the cyclic prefix.

8. The method of claim 7, wherein defining a first signal comprises evaluating:

$$b = P_0 d_{DPS},$$

where $P_0 = P(i_{opt}, j_{DPS})$ is a matrix to used calculate the first signal over the optimization range due to information sub-carriers; P(i,j) is a submatrix of matrix P that consists of elements of matrix P that are crossed by the rows indicated by index vector i and the columns indicated by index vector j; $d_{DPS}$ is a vector of information in the information sub-carriers; $i_{opt}$ is an index vector corresponding to the optimization range;

and $j_{DPS}$ is an index vector corresponding to a frequency range of the information sub-carriers.

9. The method of claim 7, wherein defining a second signal comprises evaluating:

$$P_1 x = P(i_{opt}, j_{CS}) x,$$

where $i_{opt}$ is an index vector corresponding to frequencies in the optimization range; $j_{CS}$ is an index vector corresponding to the AIC sub-carriers; P(i,j) is a submatrix of matrix P that consists of elements of matrix P that are crossed by the rows indicated by index vector i and the columns indicated by index vector j; and x is a variable vector for AIC sub-carrier data.

10. The method of claim 7, wherein computing AIC sub-carrier data comprises using a least-squares solving algorithm.

11. The method of claim 10, wherein computing AIC sub-carrier data comprises evaluating:

$$d_{CS} = \underset{x}{\mathrm{argmin}} \|P_1 x + b\|^2,$$

where $P_1 = P(i_{opt}, j_{CS})$ is a matrix that is used to calculate the second signal over the optimization range, $i_{opt}$ is the optimization range; $j_{CS}$ is a frequency range of the AIC sub-carriers; x is a variable vector for AIC sub-carrier data; and b is a frequency domain signal over the optimization range due to data and pilot sub-carriers;

$$\|y\|^2 = \sum_i |y_i|^2$$

represents the 2-norm of vector y.

12. The method of claim 11, wherein computing AIC sub-carrier data comprises evaluating:

$$d_{CS} = -(P_1^H P_1)^{-1} P_1^H b$$
$$= -(P_1^H P_1)^{-1} P_1^H P_0 d_{DPS},$$

where $P_0 = P(i_{opt}, j_{DPS})$ is a matrix used to calculate the first signal over the optimization range due to information sub-carriers; $i_{opt}$ is an index vector corresponding to the optimization range; $j_{DPS}$ is an index vector corresponding to the information sub-carriers; and $d_{DPS}$ is a vector of information in the information sub-carriers.

13. The method of claim 10, wherein computing AIC sub-carrier data comprises evaluating:

$$d_{CS} = \underset{x}{\mathrm{argmin}} \|P_1 x + b\|^2 + \lambda \|x\|^2$$
$$d_{CS} = -(P_1^H P_1 + \lambda I)^{-1} P_1^H b$$
$$= -(P_1^H P_1 + \lambda I)^{-1} P_1^H P_0 d_{DPS},$$

where $P_1=P(i_{opt},j_{CS})$ is a matrix that is used to calculate the second signal over the optimization range, $P_0=P(i_{opt},j_{DPS})$ is a matrix used to calculate the first signal over the optimization range due to information sub-carriers; $d_{DPS}$ is a vector of information in the information sub-carriers; x is a variable vector for AIC sub-carrier data; b is a frequency domain signal over the optimization range due to data and pilot sub-carriers; $i_{opt}$ is an index vector corresponding to the optimization range; $j_{DPS}$ is an index vector corresponding to the information sub-carriers; and $j_{cs}$ is an index vector corresponding to a frequency range of the AIC sub-carriers; and is a damping factor.

14. The method of claim 10, wherein computing AIC sub-carrier data comprises evaluating:

$$d_{CS} = \underset{x}{\arg\min} \|P_1 x + b\|^2$$
$$\text{subject to } \|x\|^2 \le \alpha^2,$$

where $P_1=P(i_{opt},j_{CS})$ is a matrix that is used to calculate the second signal over the optimization range; x is a variable vector for AIC sub-carrier data; b is a frequency domain signal over the optimization range due to data and pilot sub-carriers; $i_{opt}$ is an index vector corresponding to the optimization range; $j_{CS}$ is an index vector corresponding to a frequency range of the AIC sub-carriers; and is a constraining factor.

15. A method for transmitting an orthogonal frequency division multiplex (OFDM) symbol having a plurality of information sub-carriers and a plurality of active interference cancellation (AIC) sub-carriers, the method comprising:
generating AIC sub-carrier data for the plurality of AIC sub-carriers, wherein the AIC sub-carrier data are based on information to be conveyed in the OFDM symbol, wherein generating AIC sub-carrier data comprises:
for each information sub-carrier, calculating a contribution of the information sub-carrier to frequencies in an optimization range;
defining a vector of first signals over an optimization range due to the plurality of information sub-carriers;
defining a vector of second signals over the optimization range due to the plurality of AIC sub-carriers;
computing the AIC sub-carrier data based on the contributions of the information sub-carrier to each of the AIC sub-carriers, the vector of first signals, and the vector of second signals; and
generating the OFDM symbol from the AIC sub-carrier data and the information; and
transmitting the OFDM symbol.

16. The method of claim 15, wherein computing the AIC sub-carrier data comprises applying an unconstrained least squares problem solving technique, a damped least squares problem solving technique, or a constrained least squares problem solving technique.

17. A method for transmitting an orthogonal frequency division multiplex (OFDM) symbol having a plurality of information sub-carriers and a plurality of active interference cancellation (AIC) sub-carriers, the method comprising:
generating AIC sub-carrier data for the plurality of AIC sub-carriers, wherein the AIC sub-carrier data are based on information to be conveyed in the OFDM symbol;
generating the OFDM symbol from the AIC sub-carrier data and the information, wherein generating the OFDM symbol comprises:
populating the plurality of AIC sub-carriers with the AIC sub-carrier data;
populating the plurality of information sub-carriers with the information; and
transmitting the OFDM symbol.

18. A transmitter comprising:
an active interference cancellation (AIC) sub-carrier data calculation unit coupled to an information input, the AIC sub-carrier data calculation unit configured to calculate AIC sub-carrier data based on frequency-domain information provided by the information unit, said active interference cancellation (AIC) sub-carrier data calculation unit, comprising:
a least squares unit configured to implement a least squares problem solving technique to calculate the AIC sub-carrier data;
a contribution calculator coupled to the least squares unit, the contribution calculator configured to calculate a contribution of each information sub-carrier used to convey the frequency-domain information on each AIC sub-carrier in a plurality of AIC sub-carriers;
a domain conversion unit coupled to the AIC sub-carrier data calculation unit, the domain conversion unit configured to convert frequency-domain information and AIC sub-carrier data into time-domain data;
a baseband unit coupled to the domain conversion unit, the base band unit configured to add a cyclic prefix or a cyclic suffix to the time-domain data and to apply time-domain windowing or time-domain filtering to the time-domain data; and
a radio frequency circuit coupled to the baseband unit, the radio frequency circuit configured to filter and amplify the time-domain data prior to transmission.

19. The transmitter of claim 18, wherein the least squares unit is configured to implement an unconstrained least squares problem solving technique, a damped least squares problem solving technique, or a constrained least squares problem solving technique.

20. The transmitter of claim 19, wherein the AIC sub-carrier data calculation unit further comprises:
a signal defining unit coupled to the least squares unit, the signal defining unit configured to define frequency-domain signals over an optimization range due to data and pilot sub-carrier data, denoted $P_0$, and a frequency-domain signal over the optimization range due to AIC sub-carrier data, denoted $P_1$.

* * * * *